(12) United States Patent
Lee et al.

(10) Patent No.: US 10,482,563 B2
(45) Date of Patent: Nov. 19, 2019

(54) METHOD AND APPARATUS FOR PROCESSING IMAGE ENHANCEMENT ALGORITHM

(71) Applicant: Samsung Electronics Co., Ltd., Suwon-si, Gyeonggi-do (KR)

(72) Inventors: Won-jae Lee, Suwon-si (KR); Min-soo Kim, Yongin-si (KR); Young-hwan Park, Yongin-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 15/519,318

(22) PCT Filed: Oct. 13, 2015

(86) PCT No.: PCT/KR2015/010764
§ 371 (c)(1),
(2) Date: Apr. 14, 2017

(87) PCT Pub. No.: WO2016/060433
PCT Pub. Date: Apr. 21, 2016

(65) Prior Publication Data
US 2017/0243321 A1    Aug. 24, 2017

(30) Foreign Application Priority Data
Oct. 16, 2014  (KR) .......................... 10-2014-0140170

(51) Int. Cl.
*G06T 1/20*    (2006.01)
(52) U.S. Cl.
CPC ............ *G06T 1/20* (2013.01); *G06T 2200/28* (2013.01)

(58) Field of Classification Search
None
See application file for complete search history.

(56) References Cited

U.S. PATENT DOCUMENTS

| 6,310,921 | B1* | 10/2001 | Yoshioka ........... H04N 21/4341 348/E5.108 |
| 6,842,844 | B1* | 1/2005 | Fadavi-Ardekani ........ H04M 11/062 711/147 |
| 8,239,442 | B2 | 8/2012 | Lerner |
| 8,250,578 | B2 | 8/2012 | Krishnamurthy et al. |
| 8,572,299 | B2* | 10/2013 | Pross .................... G06F 9/3881 345/503 |
| 8,625,677 | B2 | 1/2014 | Lee |
| 9,098,297 | B2 | 8/2015 | Poff et al. |
| 2003/0065704 | A1 | 4/2003 | Buch |

(Continued)

FOREIGN PATENT DOCUMENTS

| JP | 2013-41361 A | 2/2013 |
| KR | 10-2001-0020250 A | 3/2001 |

*Primary Examiner* — Yanna Wu
(74) *Attorney, Agent, or Firm* — Jefferson IP Law, LLP (57) ABSTRACT

Disclosed are an image enhancement algorithm processing method and apparatus. The image enhancement algorithm processing method includes setting a plurality of different control registers, indexing and storing the set plurality of control registers, calling a first control register corresponding to a first index among the stored plurality of control registers by using the first index, and commanding a hardware accelerator to perform a first function defined by the called first control register.

11 Claims, 7 Drawing Sheets

(56) References Cited

U.S. PATENT DOCUMENTS

2007/0118724 A1      5/2007  Patel
2009/0216958 A1 *    8/2009  Biles .................. G06F 13/1668
                                                          711/148
2015/0046677 A1 *    2/2015  Moloney ............... G09G 5/397
                                                          712/29

* cited by examiner

METHOD AND APPARATUS FOR PROCESSING IMAGE ENHANCEMENT ALGORITHM

TECHNICAL FIELD

The present disclosure relates to an image enhancement algorithm processing method and apparatus, and more particularly, to an image enhancement algorithm processing method and apparatus in which a processor controls various image processing functions performed by a hardware accelerator, and the processor and the hardware accelerator share a memory when an image enhancement algorithm process is being performed, thereby preventing a memory stall.

BACKGROUND ART

Recently, with continuous advancements in image enhancement technology, various image processing algorithms are being developed. When desiring to apply an image enhancement algorithm to a high-resolution image which is called an ultra-high definition image and has a resolution of 4 K or 8 K, due to a large amount of data and the number of arithmetic operations, it is impossible to process the high-resolution image in real time with only a number of processors, and thus, the high-resolution image is processed by using a number of hardware accelerators.

The hardware accelerators are designed to accelerate data processing functions or arithmetic operations for enhancing a processing ability of a processor and increasing a processing speed. For example, like calculation of a mean, a standard deviation, a minimum/maximum value, and/or the like, an arithmetic operation which is generally performed in an image processing algorithm may be performed by a hardware accelerator. Also, like a finite impulse response (FIR) filter or a Huffman encoder/decoder, a function which is high in technical maturity may be performed by the hardware accelerator.

A processor controls a function performed by a hardware accelerator. For example, the processor may control the start and end of driving of the hardware accelerator. Also, the processor may set a parameter, which defines a certain function of the hardware accelerator, such as a horizontal length and a vertical length of an input image and a weight value of each of a plurality of pixels and may transmit a command to the hardware accelerator.

Moreover, the processor may process some image processing algorithms in software, in addition to a function of transmitting a control command to the hardware accelerator. Therefore, the processor executes the image processing algorithms and sets a parameter for controlling the hardware accelerator, and for this reason, a large overhead occurs. Also, when a number of hardware accelerators and processors access the same address of a memory for obtaining input data for the image enhancement algorithm, a memory stall occurs.

DISCLOSURE

Description of Drawings

These and/or other aspects will become apparent and more readily appreciated from the following description of the exemplary embodiments, taken in conjunction with the accompanying drawings in which.

BEST MODE

Provided are an image enhancement algorithm processing method and apparatus for removing an overhead which occurs when a processor controls a hardware accelerator used to perform an image enhancement algorithm applied to an image.

Provided is a non-transitory computer-readable storage medium storing a program for executing the method in a computer.

Additional aspects will be set forth in part in the description which follows and, in part, will be apparent from the description, or may be learned by practice of the presented exemplary embodiments.

According to an aspect of an exemplary embodiment, an image enhancement algorithm processing method performed by a processor includes: setting a plurality of different control registers; indexing and storing the set plurality of control registers; calling a first control register corresponding to a first index among the stored plurality of control registers by using the first index; and commanding a hardware accelerator to perform a first function defined by the called first control register.

The plurality of different control registers may define different functions.

The image enhancement algorithm processing method may further include: calling a second control register corresponding to a second index among the stored plurality of control registers by using the second index; and commanding the hardware accelerator to perform a second function defined by the called second control register, wherein the first function differs from the second function.

The calling of the second control register may include: automatically converting, by a computer program, an index; and calling, by the processor, a control register corresponding to an index obtained through the conversion among the stored plurality of control registers by using the obtained index.

The image enhancement algorithm processing method may further include: receiving, by the hardware accelerator, a command defined by the first control register; and performing, by the hardware accelerator, the first function.

The image enhancement algorithm processing method may further include: receiving, by the hardware accelerator, a command defined by the second control register; and performing, by the hardware accelerator, the second function.

According to an aspect of another exemplary embodiment, an image enhancement algorithm processing method performed by a processor includes: setting, by the processor, a control register defining a second function while a hardware accelerator is performing a first function; and commanding the hardware accelerator to perform the second function defined by the set control register.

According to an aspect of an exemplary embodiment, an image enhancement algorithm processing method based on a structure, where a processor and one or more hardware accelerators share a memory, includes: reading certain data from the memory to store the read data in a certain buffer; and receiving, by the processor and the one or more hardware accelerators, necessary data from the certain buffer.

The certain data may include a plurality of image pixels.

The image enhancement algorithm processing method may further include: assigning priorities to the processor and the one or more hardware accelerators; and when the processor and the one or more hardware accelerators simultaneously access the certain buffer, accessing the memory in order according to the assigned priorities.

According to an aspect of another exemplary embodiment, an image enhancement algorithm processing apparatus includes a processor configured to set a plurality of different control registers, index and store the set plurality of control registers, call a first control register corresponding to a first index among the stored plurality of control registers by using the first index, and command a hardware accelerator to perform a first function defined by the called first control register.

The plurality of different control registers may define different functions.

After commanding the hardware accelerator to perform the first function, the process may call a second control register corresponding to a second index among the stored plurality of control registers by using the second index, and may command the hardware accelerator to perform a second function defined by the called second control register. The first function may differ from the second function.

In the calling of the second control register, a computer program may automatically convert an index, and the processor may call a control register corresponding to an index obtained through the conversion among the stored plurality of control registers by using the obtained index.

The image enhancement algorithm processing apparatus may further include the hardware accelerator configured to receive a command defined by the first control register and perform the first function.

The image enhancement algorithm processing apparatus may further include the hardware accelerator configured to receive a command defined by the second control register and perform the second function.

According to an aspect of an exemplary embodiment, an image enhancement algorithm processing apparatus includes a processor configured to set a control register defining a second function while a hardware accelerator is performing a first function and after the hardware accelerator performs the first function, command the hardware accelerator to perform the second function defined by the set control register.

According to an aspect of another exemplary embodiment, an image enhancement algorithm processing apparatus includes a structure where a processor and one or more hardware accelerators share a memory, wherein the processor or the one or more hardware accelerators read(s) certain data from the memory, store(s) the read data in a certain buffer, and receive(s) necessary data from the certain buffer.

The certain data may include a plurality of image pixels.

Priorities may be assigned to the processor and the one or more hardware accelerators, and when the processor and the one or more hardware accelerators may simultaneously access the certain buffer, the processor and the one or more hardware accelerators may access the memory in order according to the assigned priorities.

According to an aspect of another exemplary embodiment, provided is a non-transitory computer-readable storage medium storing a program for executing the image enhancement algorithm processing method in a computer.

MODE FOR INVENTION

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects of the present inventive concept. As used herein, the term "and/or" includes any and all combinations of one or more of the associated listed items. Expressions such as "at least one of," when preceding a list of elements, modify the entire list of elements and do not modify the individual elements of the list.

Hereinafter, exemplary embodiments will be described in detail with reference to the accompanying drawings. The configuration shown in the drawings embodiments described herein, and nothing in the most preferred embodiment of the inventive concept only and does not represent all of the technical idea of the inventive concept, as in effect at the time of this application, you may replace them, it should be understood that there may be various equivalents and a modified example.

Figure 1:
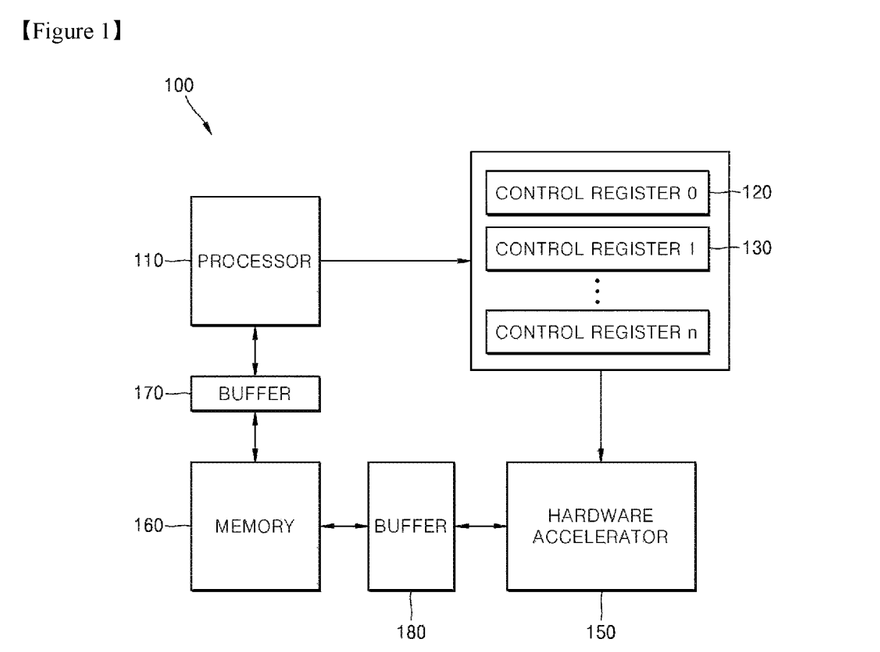
FIG. 1 is a diagram for describing an image enhancement algorithm processing apparatus according to an exemplary embodiment.

FIG. 1 is a diagram for describing an image enhancement algorithm processing apparatus according to an exemplary embodiment.

A processor 110 may include a central processing unit (CPU) which is designed based on a Von Newman architecture or a Harvard architecture. Also, the processor 110 may include architectures such as ARM, microprocessor without interlocked pipeline stage (MIPS), power PC, X86, AVR, coldfile/38k, and 8051-series CPU, but is not limited thereto.

A plurality of hardware accelerators 150 may be designed to accelerate, by using hardware, a data processing function or a calculation function which is used for increasing a processing speed of the processor 110. That is, the hardware accelerators 150 may instead perform various functions performed by the processor, and thus, the processor 110 efficiently uses resources. When desiring to execute an image processing algorithm for image enhancement, the processor 110 may software-process an algorithm having many changes in function, and the hardware accelerators 150 may perform a formal and normal operation to efficiently use resources of the processor 110.

For example, like calculation of a mean, a standard deviation, a minimum/maximum value, and/or the like, an arithmetic operation which is generally performed in an image processing algorithm may be performed by the hardware accelerators 150. Also, like a FIR filter or a Huffman encoder/decoder, a function which is high in technical maturity may be performed by the hardware accelerators 150.

The processor 110 may issue a command to perform operations of the hardware accelerators 150 and may control the operations. That is, the processor 10 may decode an instruction read from a main storage device to transmit a control signal to the hardware accelerators 150, thereby issuing a command to perform functions of the hardware accelerators 150. A control register may be a register that stores instructions read from the main storage device.

The processor 110 may set a plurality of control registers that define various functions of the hardware accelerators 150 to issue a command to perform the functions. Also, each of the control registers may include a plurality of parameters for defining different operations of the hardware accelerators 150.

In detail, for example, a control register 0 120 of the processor 110 may define a function of calculating a maximum value among M×N pixels near a current pixel. Here, M and N may each be an arbitrary positive constant. A control register 1 130 may include, as parameters, an arbitrary weight value and a standard deviation "σ1" of the M×N pixels near the current pixel for performing Gaussian filtering on the current pixel. Also, a control register 2 may include, as parameters, an arbitrary weight value and a standard deviation "σ2" of the M×N pixels near the current pixel for performing the Gaussian filtering on the current pixel. The arbitrary weight value and the standard deviation "σ2" which are included in the control register 2 may differ from the arbitrary weight value and the standard deviation "σ1" which are included in the control register 1.

According to an exemplary embodiment, the processor 110 and the hardware accelerators 150 may share a memory 160. A plurality of buffers 170 and 180 may be further provided for preventing a memory stall from occurring when the processor 110 and the hardware accelerators 150 simultaneously access the same address of the shared memory 160. The processor 110 or the hardware accelerators 150 may previously read pieces of data, may store the pieces of data in the buffers 170 and 180, and may receive necessary data from a certain buffer.

According to an exemplary embodiment, before the processor 110 issues a command to perform operations of the hardware accelerators 150, the processor 110 may set a plurality of different control registers and may store the plurality of control registers in a certain register buffer. The plurality of control registers stored in the register buffer may define different functions of the hardware accelerators 150. The processor 110 may call a necessary control register and then may command each of the hardware accelerators 150 to perform a certain function by using a parameter included in the called control register. Hereinafter, this will be described in detail with reference to FIG. 2.

Figure 2:
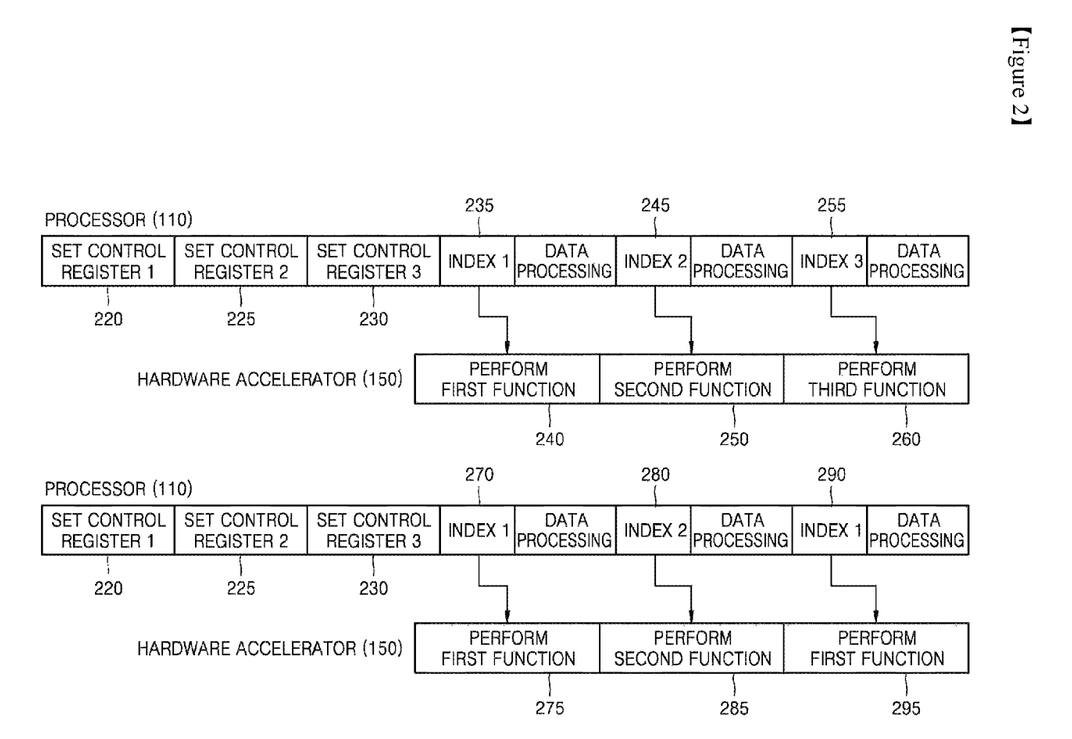
FIG. 2 illustrates an operation of an image enhancement algorithm processing apparatus based on a flow of time, according to an exemplary embodiment.

FIG. 2 illustrates an operation of an image enhancement algorithm processing apparatus based on a flow of time, according to an exemplary embodiment.

The processor 110 may define and store control registers (for example, a control register 1 to a control register n) that respectively define certain functions of the hardware accelerators 150. For convenience of description, the processor 110 is assumed as setting three control registers, and the three control registers may be respectively referred to as a first control register 220, a second control register 225, and a third control register 230. The first control register 220, the second control register 225, and the third control register 230 may respectively define a first function, a second function, and a third function of each of the hardware accelerators 150. The first to third functions may differ.

According to an exemplary embodiment, the processor 110 may index and store the first control register 220, the second control register 225, and the third control register 230 in a certain buffer. The processor 110 may call a stored control register by using an index and may command each of the hardware accelerators 150 to perform a function defined by the called control register.

An upper graph and a lower graph of FIG. 2 respectively show operations, based on flows of different times, of the image enhancement algorithm processing apparatus 100 according to an exemplary embodiment. To first describe the upper graph of FIG. 2, the processor 110 may set a first control register 220 (an index 1), a second control register 225 (an index 2), and a third control register 230 (an index 3). The processor 110 may call the first control register 220 by using an index 1 235 to command the hardware accelerators 150 to perform the first function, and the hardware accelerators 150 receiving the command may perform (240) the first function. The processor 110 may call the second control register 225 by using an index 2 245 to command the hardware accelerators 150 to perform the second function, and the hardware accelerators 150 receiving the command may perform (250) the second function. The processor 110 may call the third control register 230 by using an index 3 255 to command the hardware accelerators 150 to perform the third function, and the hardware accelerators 150 receiving the command may perform (260) the third function.

According to an exemplary embodiment, an operation where the processor 110 sets, indexes, and stores a plurality of control registers may be performed only once in an initialization operation. A control register setting operation subsequent to the initialization operation may be performed by calling a control register from a buffer, which stores the control register, by using an index.

To describe the lower graph of FIG. 2, the processor 110 may set a first control register 220 (an index 1), a second control register 225 (an index 2), and a third control register 230 (an index 3). The processor 110 may call the first control register 220 by using an index 1 270 for commanding the hardware accelerators 150 to perform the first function. The processor 110 may command the hardware accelerators 150 to perform the first function, and the hardware accelerators 150 receiving the command may perform (275) the first function.

Subsequently, the processor 110 may call the second control register 225 by using the index 2. The processor 110 may call the second control register 225 to command the hardware accelerators 150 to perform the second function, and the hardware accelerators 150 receiving the command may perform (285) the second function.

Subsequently, the processor 110 may call the first control register 220 by using the index 1. The processor 110 may call the first control register 220 to command the hardware accelerators 150 to perform the first function, and the hardware accelerators 150 receiving the command may perform (295) the first function. In other words, the processor 110 may call a pre-stored control register by using an index without again setting a control register defining the first function.

According to an exemplary embodiment, the processor 110 may automatically call an index. That is, the index may be automatically converted by a computer program, and the processor 110 may call a control register by using an index obtained through the conversion. For example, a computer program may be programmed in order for indexes to be converted in the order of 3, 1, and 2 when the processor 110 sequentially commands the hardware accelerators 150 to perform the third function, the first function, and the second function. The processor 110 may call the control register by using the indexes which are converted in the order of 3, 1, and 2 according to the computer program, and each of the hardware accelerators 150 may sequentially perform the third function, the first function, and the second function by using a parameter included in the called control register.

Figure 3:
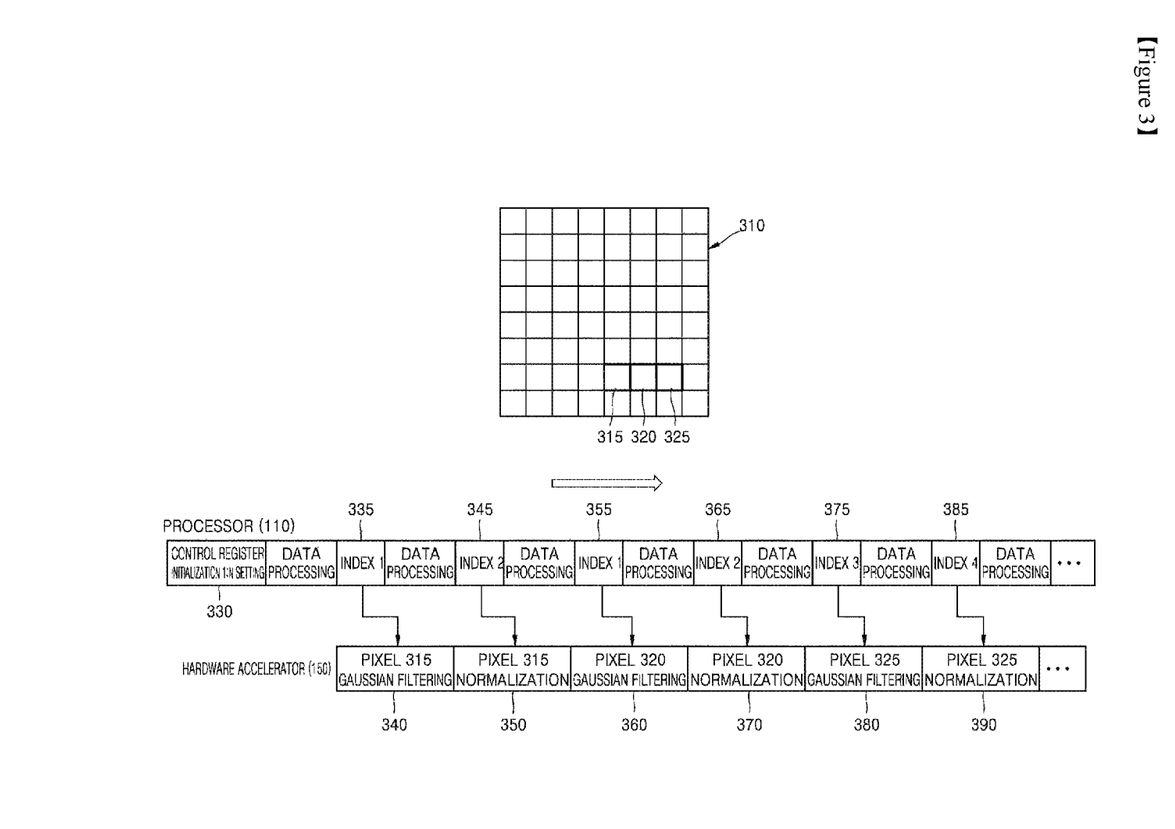
FIG. 3 illustrates an operation of an image enhancement algorithm processing apparatus based on a flow of time, according to an exemplary embodiment.

FIG. 3 illustrates an operation of the image enhancement algorithm processing apparatus 100 based on a flow of time, according to an exemplary embodiment.

In order to enhance the quality of an image, the image enhancement algorithm processing apparatus 100 may apply various two-dimensional (2D) filters, such as a Gaussian filter, a Sobel filter, and/or the like, to a pixel. Also, the image enhancement algorithm processing apparatus 100 may normalize a pixel to which filtering is applied, and may calculate a maximum value or a minimum value among a certain number of pixel values near a current pixel, for removing noise and/or the like.

For convenience of description, an image enhancement algorithm that applies a 5×5 size Gaussian filter to all pixels constituting an 8×8 image 310 and normalizes a pixel value to which a filter is applied may be considered. In detail, the image enhancement algorithm processing apparatus 100 may apply the Gaussian filter to all pixels constituting an image by using arbitrary weight information and a standard deviation and then may perform a linear arithmetic operation, such as "(pixel value×A+B)/C", on a filtered pixel value to normalize the pixel value. Here, A, B, and C may each be a constant.

Arbitrary weight information and standard deviation values of a current pixel 315 and twenty-four pixels near the current pixel 315 may be used in order for the hardware accelerator 150 to apply the 5×5 size Gaussian filter to the current pixel 315. The processor 110 may store, as a parameter in a control register, at least one of 5×5 pieces of weight information "w1", one standard deviation "σ1", a filter size, and an address storing an image in a memory, for commanding the hardware accelerator 150 to apply the Gaussian filter to the pixel 315. The control register may be referred to as a first control register.

The constants "A, B and C" may be used in order for the hardware accelerator 150 to perform a normalization operation, defined as "(pixel value×A+B)/C", on a filtered pixel by using a parameter stored in the first control register. Therefore, the processor 110 may store, as a parameter in a control register, at least one of the constants "A, B and C" and an address storing a filtered image in the memory, for commanding the hardware accelerator 150 to normalize the pixel 315. The control register may be referred to as a second control register.

Subsequently, each of the hardware accelerator 150 may perform Gaussian filtering and a normalization operation on a pixel 325. Since the pixel 325 is a pixel that is arranged at a position second closest to a right boundary of an image, the 5×5 size Gaussian filter applied to the pixel 315 cannot be applied to the pixel 325 as-is, and thus, it may be considered to apply a 3×5 size Gaussian filter to the pixel 325. Therefore, weight information "w2" and a standard deviation "σ2" of a Gaussian filter applied to the pixel 325 may have values which differ from the weight information "w1" and the standard deviation "σ1" of the Gaussian filter applied to the pixel 315. Therefore, the processor 110 may store, as a parameter in a control register, at least one of 3×5 pieces of weight information "w2", one standard deviation "σ2", a filter size, and an address storing an image in the memory, for commanding the hardware accelerator 150 to apply the Gaussian filter to the pixel 325. The control register may be referred to as a third control register.

A normalization operation on Gaussian-filtered pixels defined as the parameter stored in the third control register may be performed by using the parameter (the constants "A, B and C") included in the second control register, or may be performed by using another parameter. That is, the processor 110 may store, as a parameter in a control register, at least one of constants "A', B' and C'" and an address storing a filtered image in the memory, for commanding the hardware accelerator 150 to normalize the pixel 325. The control register may be referred to as a fourth control register.

To again describe an overall operation where the image enhancement algorithm processing apparatus 100 applies the image enhancement algorithm to the pixels 315, 320 and 325, the processor 110 may set and index N number of control registers including the first to fourth control registers and may store the indexed control registers in a buffer in a register initialization operation 330. Here, N may be the arbitrary number of control registers necessary for the image enhancement algorithm.

The processor 110 may sequentially call the first control register and the second control register by using an index 1 335 and an index 2 345 and may command the hardware accelerator 150 to perform the Gaussian filtering on the pixel 315 by using the weight information "w1" and the standard deviation "σ1" and to normalize the pixel 315 by using the constants "A, B and C".

The Gaussian filtering and normalization performed on the pixel 315 may be identically applied to the pixel 320. Therefore, the processor 110 may call a control register 1 and a control register 2 by using an index 1 355 and an index 2 365 without re-setting a parameter necessary for Gaussian filtering and normalization and may command the hardware accelerator 150 to perform the Gaussian filtering on the pixel 320 by using the weight information "w1" and the standard deviation "σ1" and to normalize the pixel 320 by using the constants "A, B and C".

The processor 110 may sequentially call the third control register and the fourth control register by using an index 1 375 and an index 2 385 and may command the hardware accelerator 150 to perform a Gaussian filtering operation and a normalization operation on the pixel 325 by using the weight information "w2" and the standard deviation "σ2".

According to an exemplary embodiment, the processor 110 may automatically call an index. That is, the index may be automatically converted by a computer program, and the processor 110 may call a control register by using an index obtained through the conversion. For example, when the image enhancement algorithm processing apparatus 100 desires to sequentially apply a Gaussian filtering operation and a normalization operation to the pixels 315, 320 and 325, the computer program may be previously programmed in order for indexes to be converted in the order of 1, 2, 1, 2, 3 and 4. The processor 110 may call a control register by using the indexes which are automatically converted in the order of 1, 2, 1, 2, 3 and 4 according to the computer program.

The hardware accelerator 150 receiving a command may sequentially perform the Gaussian filtering operation and the normalization operation on each of the pixels 315, 320 and 325 (340, 350, 360, 370, 380 and 390).

Figure 4:
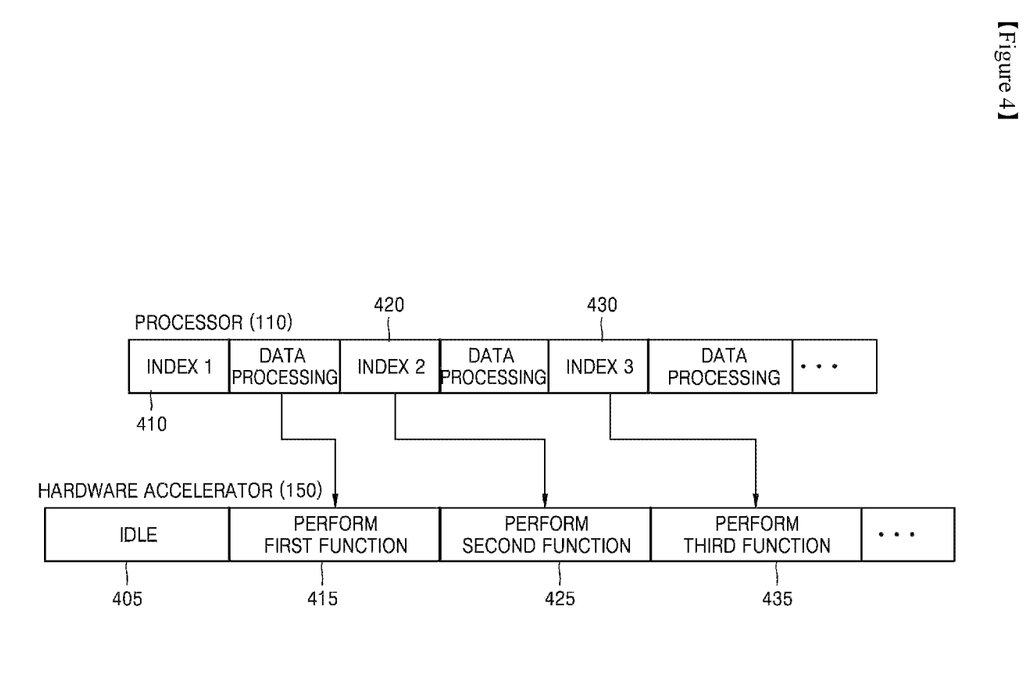
FIG. 4 illustrates an operation of an image enhancement algorithm processing apparatus based on a flow of time, according to an exemplary embodiment.

FIG. 4 illustrates an operation of the image enhancement algorithm processing apparatus 100 based on a flow of time, according to an exemplary embodiment.

The processor 110 may set a control register (a first control register), which defines a first function, in the hardware accelerator 150. In this case, the processor 110 may call (410) an index 1 to set a first control register. The hardware accelerator 150 may start to operate in an idle state (405) and may perform (415) a first function of receiving a command from the processor 110.

According to an exemplary embodiment, the processor 110 may set a control register (a second control register), which defines a second function performed after the first function, in the hardware accelerator 150 while the hardware accelerator 150 is performing (415) the first function, namely, before an arithmetic operation on the first function is completed. Therefore, when the hardware accelerator 150 completes the first function, this is in a state where the processor 110 has already set the second control register, and thus, the hardware accelerator 150 may perform (425) a function (the second function) defined by the second control register without waiting for until the processor 110 sets the second control register.

The processor 110 may set a control register (a third control register), which defines a third function performed after the second function, in the hardware accelerator 150 while the hardware accelerator 150 is performing (425) the second function, namely, before an arithmetic operation on the second function is completed. Therefore, when the hardware accelerator 150 completes the second function, this is in a state where the processor 110 has already set the third control register, and thus, the hardware accelerator 150 may perform (435) a function (the third function) defined by the third control register without waiting for until the processor 110 sets the third control register.

For example, as illustrated in FIG. 3, a case of executing the image enhancement algorithm that performs Gaussian filtering on a pixel constituting an image and performs a normalization operation on a filtered pixel may be considered. While the hardware accelerator 150 is applying a Gaussian filter to a pixel 315 to determine a pixel value, the processor 110 may previously set a parameter necessary for performing a normalization operation on the pixel value. When the hardware accelerator 150 performs Gaussian filtering on the pixel 315, the processor 110 may command the hardware accelerator 150 to perform a normalization operation on a filtered pixel by using a previously set control register.

As described above, before the processor 110 issues a command to perform an operation of the hardware accelerator 150, the processor 110 may set and index a plurality of different control registers and may store the indexed plurality of control registers in a certain buffer. The processor 110 may call a necessary control register by using an index.

According to an exemplary embodiment, an operation where the processor 110 sets a control register defining the second function before the hardware accelerator 150 completes the first function may be performed by calling (420 and 430) a pre-stored control register by using an index. In this case, it is obvious that the index is automatically converted by a computer program and a control register is called by using an index obtained through the conversion.

Figure 5:
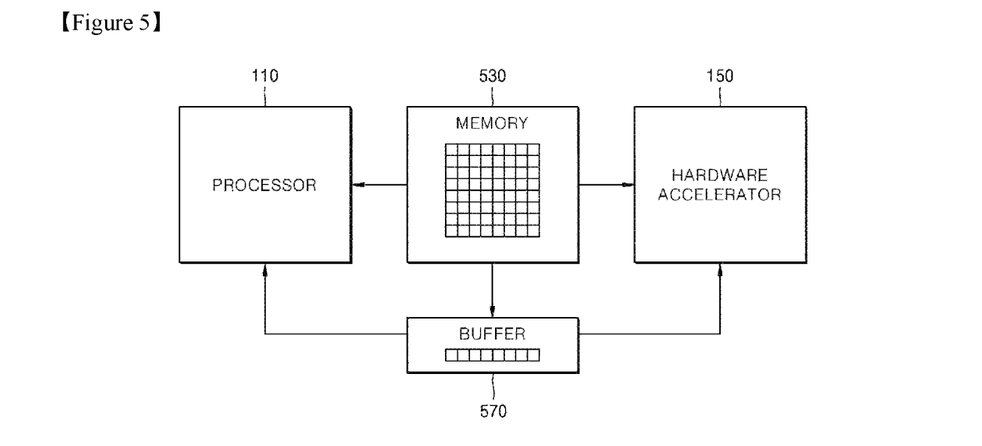
FIG. 5 illustrates an image enhancement algorithm processing apparatus according to an exemplary embodiment.

FIG. 5 illustrates an image enhancement algorithm processing apparatus 100 according to an exemplary embodiment.

As described above, a hardware accelerator 150 may perform various functions. For example, like calculation of a mean, a standard deviation, a minimum/maximum value, and/or the like, an arithmetic operation which is generally performed in an image processing algorithm may be performed by the hardware accelerator 150. Also, like a FIR filter or a Huffman encoder/decoder, a function which is high in technical maturity may be performed by the hardware accelerator 150.

Data input to the hardware accelerator 150 and output data obtained by arithmetic-processing the input data may be transmitted through a bus which is provided between a processor 110 and the hardware accelerator 150, and for this reason, a problem of a memory bandwidth occurs. Particularly, in an image enhancement algorithm for a high-resolution image of 4 K/8 K, a very lot of data may be transmitted between the processor 110 and the hardware accelerator 150, causing the problem of the memory bandwidth and degradation of performance.

According to an exemplary embodiment, in the image enhancement algorithm processing apparatus 100, the processor 110 and the hardware accelerator 150 may share an internal memory 530 of the processor 110. The shared memory 530 may be a memory accessible by the processor 110 and the hardware accelerator 150. Therefore, an input/output of data may be performed by the hardware accelerator 150 directly accessing the shared memory 530.

According to an exemplary embodiment, the image enhancement algorithm processing apparatus 100 may include a certain buffer 570 and thus may read necessary data from the memory 530 to store the read data in the certain buffer 570. In an image processing algorithm for image enhancement, an algorithm may be generally applied in units of a pixel, a line, or a block, and a pattern for reading data may be normalized. Therefore, the image enhancement algorithm processing apparatus 100 may predict necessary data, may read the necessary data from the memory 530, and may store the read data in the certain buffer 570.

According to an exemplary embodiment, certain data which is read from the memory 530 and is stored in the buffer 570 may include a plurality of pixels like one horizontal or vertical line or one block. In a multi-memory bank, all data stored in one bank may be read, or data stored in all internal banks of a memory may be read.

According to an exemplary embodiment, the buffer 570 may be provided as one or more (not shown), and the one or more buffers 570 may be divided into a buffer accessible by the processor 110 and a buffer accessible by the hardware accelerator 150. Also, the hardware accelerator 150 may be provided as one or more.

In order to prevent a memory stall from occurring when the processor 110 and a plurality of the hardware accelerators 150 access the same memory address for obtaining input data, the processor 110 or the plurality of hardware accelerators 150 may receive necessary data from the buffer 570 instead of the shared memory 530.

According to an exemplary embodiment, the image enhancement algorithm processing apparatus 100 may assign priorities to the processor 110 and the plurality of hardware accelerators 150. When the processor 110 and the plurality of hardware accelerators 150 simultaneously access the memory 530, the processor 110 and the plurality of hardware accelerators 150 may access the memory 530 in order according to the assigned priorities.

For example, when there are the processor 110, a hardware accelerator 1 for performing Gaussian filtering, a hardware accelerator 2 for performing Sobel filtering, and a hardware accelerator 3 for calculating a maximum value of a pixel, the image enhancement algorithm processing apparatus 100 may assign No. 4 priority to the processor 110, No. 1 priority to the hardware accelerator 1, No. 3 priority to the hardware accelerator 2, and No. 2 priority to the hardware accelerator 3. When the processor 110, the hardware accelerator 1, the hardware accelerator 2, and the hardware accelerator 3 simultaneously access the memory 530, the processor 110 and the hardware accelerators 1 to 3 may access the memory 530 in the order of the hardware accelerator 1, the hardware accelerator 3, the hardware accelerator 2, and the processor 110 according to the assigned priorities.

According to an exemplary embodiment, the number of operations performed by the hardware accelerator 150 may generally be larger than the number of operations performed by the processor 110, and thus, the image enhancement algorithm processing apparatus 100 may assign a priority, which is higher than that of the processor 110, to the hardware accelerator 150.

An algorithm based on the assigned priorities may be identically executed even when the processor 110 and the plurality of hardware accelerators 150 simultaneously access the buffer 570, and thus, its detailed description is not provided.

Figure 6:
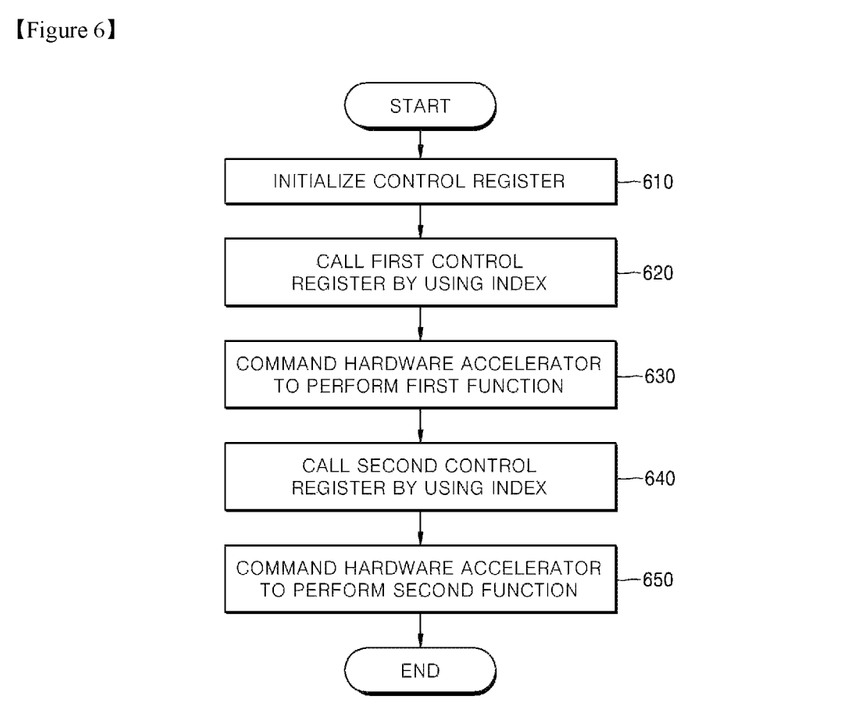
FIG. 6 illustrates a flowchart of an image enhancement algorithm processing method according to an exemplary embodiment.

FIG. 6 illustrates a flowchart of an image enhancement algorithm processing method according to an exemplary embodiment. FIG. 6 is a diagram illustrating another example of the image enhancement algorithm processing apparatus 100 illustrated in FIGS. 2 to 4. Therefore, although not described below, the details described above on the image enhancement algorithm processing apparatus 100 of FIG. 2 may be applied to the image enhancement algorithm processing method illustrated in FIG. 6.

In operation 610, the image enhancement algorithm processing apparatus 100 may set and store a necessary number of control registers defining a certain function of the hardware accelerator 150. For convenience of description, it is assumed that three control registers are set, and the three control registers may be respectively referred to as a first control register, a second control register, and a third register. The first control register, the second control register, and the third control register may respectively define a first function, a second function, and a third function of the hardware accelerator 150. The first to third functions may differ.

According to an exemplary embodiment, in operation 610, the image enhancement algorithm processing apparatus 100 may index and store the first control register, the second control register, and the third control register in a certain buffer.

In operation 620, the processor 110 may call a stored control register by using an index, and in operation 630, the processor 110 may command the hardware accelerator 150 to perform a function defined by the called control register.

According to an exemplary embodiment, an operation where the image enhancement algorithm processing apparatus 100 sets and stores a plurality of control registers may be performed only once in an initialization operation. A control register setting operation subsequent to the initialization operation may be performed by calling a control register from a buffer, which stores the control register, by using an index.

For convenience of description, only an operation of calling the first control register and the second register is illustrated, but the present embodiment is not limited thereto. It is obvious that the image enhancement algorithm processing apparatus 100 may set, index, and store a necessary number of control registers for executing the image enhancement algorithm and may call a plurality of arbitrary control registers by using an index.

Figure 7:
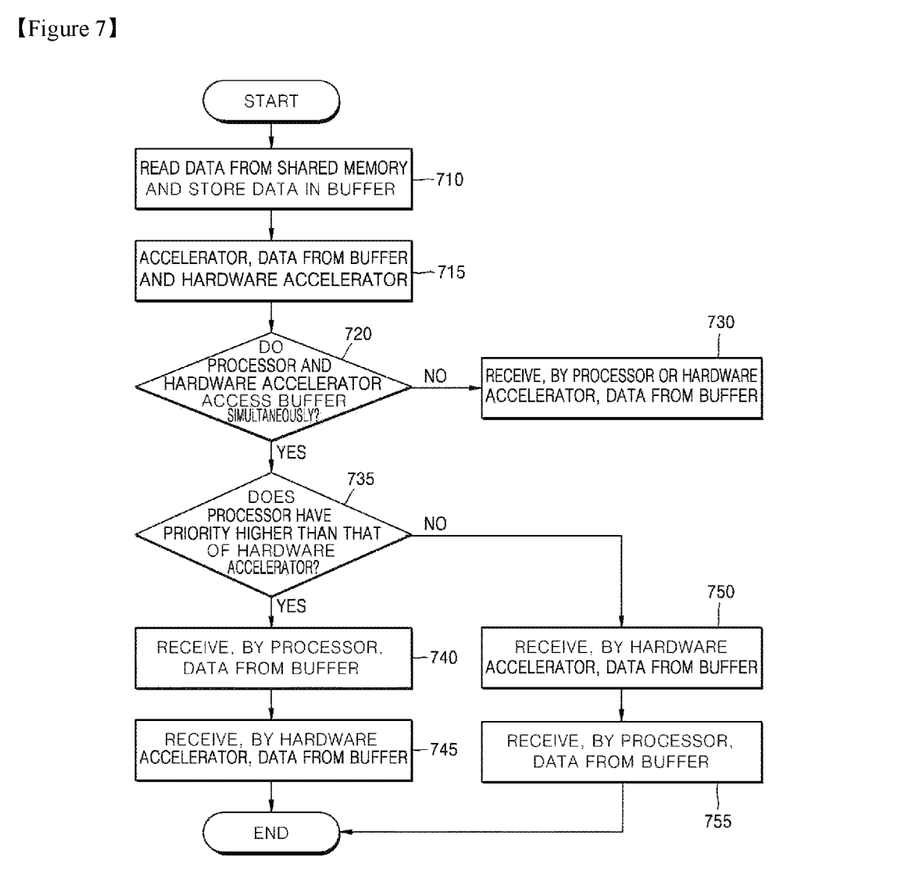
FIG. 7 illustrates a flowchart of an image enhancement algorithm processing method according to an exemplary embodiment.

FIG. 7 illustrates a flowchart of an image enhancement algorithm processing method according to an exemplary embodiment. FIG. 7 is a diagram illustrating another example of the image enhancement algorithm processing apparatus 100 illustrated in FIG. 5. Therefore, although not described below, the details described above on the image enhancement algorithm processing apparatus 100 of FIG. 5 may be applied to the image enhancement algorithm processing method illustrated in FIG. 7.

As described above, the processor 110 and the hardware accelerator 150 may share an internal memory of the processor 110. The shared memory may be a memory accessible by the processor 110 and the hardware accelerator 150. Therefore, an input/output of data may be performed by the hardware accelerator 150 directly accessing the shared memory.

In operation 710, the image enhancement algorithm processing apparatus 100 may read necessary data from the memory to store the read data in a certain buffer. In the image processing algorithm for image enhancement, an algorithm may be generally applied in units of a pixel, a line, or a block, and a pattern for reading data may be normalized. Therefore, in operation 710, the image enhancement algorithm processing apparatus 100 may predict necessary data, may read the necessary data from the memory, and may store the read data in the certain buffer.

According to an exemplary embodiment, certain data which is read from the memory and is stored in the certain buffer in operation 710 may include a plurality of pixels like one horizontal or vertical line or one block. In a multi-memory bank, all data stored in one bank may be read, or data stored in all internal banks of a memory may be read.

According to an exemplary embodiment, the buffer in operation 710 may be provided as one or more (not shown), and the one or more buffers may be divided into a buffer accessible by the processor 110 and a buffer accessible by the hardware accelerator 150. According to an exemplary embodiment, the hardware accelerator 150 may also be provided in plurality. In order to prevent a memory stall from occurring when the processor 110 and the plurality of hardware accelerators 150 access the same memory address, the processor 110 or the plurality of hardware accelerators 150 may receive necessary data from the buffer instead of the shared memory.

In operation 715, the image enhancement algorithm processing apparatus 100 may assign priorities to the processor 110 and the hardware accelerator 150. When the processor 110 and the hardware accelerator 150 do not simultaneously access the buffer, the accessing processor 110 or hardware accelerator 150 may receive data from the buffer in operation 730. However, when the processor 110 and the hardware accelerator 150 simultaneously access the buffer in operation 720, the processor 110 and the hardware accelerator 150 may access the buffer in order according to the priorities which are assigned in operation 715. Therefore, when the processor 110 is higher in priority than the hardware accelerator 150, the processor 110 and the hardware accelerator 150 may receive the data from the buffer in the order of the processor 110 and the hardware accelerator 150 in operations 740 and 745. On the other hand, when the hardware accelerator 150 is higher in priority than the processor 110, the processor 110 and the hardware accelerator 150 may receive the data from the buffer in the order of the hardware accelerator 150 and the processor 110 in operations 750 and 755.

According to an exemplary embodiment, if the hardware accelerator 150 is provided in plurality, the image enhancement algorithm processing apparatus 100 may assign priorities to the processor 110 and the plurality of hardware accelerators 150 in operation 715. When the processor 110 and the plurality of hardware accelerators 150 simultaneously access the memory in operation 720, the processor 110 and the plurality of hardware accelerators 150 may access the memory in order according to the assigned priorities. For example, when there are the processor 110, a hardware accelerator 1 for performing Gaussian filtering, a hardware accelerator 2 for performing Sobel filtering, and a hardware accelerator 3 for calculating a maximum value of a pixel, the image enhancement algorithm processing apparatus 100 may assign No. 4 priority to the processor 110, No. 1 priority to the hardware accelerator 1, No. 3 priority to the hardware accelerator 2, and No. 2 priority to the hardware accelerator 3. When the processor 110, the hardware accelerator 1, the hardware accelerator 2, and the hardware accelerator 3 simultaneously access the memory, the processor 110 and the hardware accelerators 1 to 3 may access the memory in the order of the hardware accelerator 1, the hardware accelerator 3, the hardware accelerator 2, and the processor 110 according to the assigned priorities.

According to an exemplary embodiment, in consideration of that the number of operations performed by the hardware accelerator 150 of the image enhancement algorithm processing apparatus 100 may generally be larger than the number of operations performed by the processor 110, the image enhancement algorithm processing apparatus 100 may assign a priority, which is higher than that of the processor 110, to the hardware accelerator 150.

The method according to the exemplary embodiments may also be embodied as computer readable codes on a computer readable recording medium. The computer readable recording medium is any data storage device that may store data which may be thereafter read by a computer system. Examples of the computer-readable recording medium include read-only memory (ROM), random-access memory (RAM), CD-ROMs, magnetic tapes, floppy disks, and optical data storage devices. The computer readable recording medium may also be distributed over network coupled computer systems so that the computer readable code may be stored and executed in a distributed fashion.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of an embodiment of the inventive concept is that it valuably supports and services the historical trend of reducing costs, simplifying systems, and increasing performance. These and other valuable aspects of an embodiment of the inventive concept consequently further the state of the technology to at least the next level.

While the invention has been described in conjunction with a specific best mode, it is to be understood that many alternatives, modifications, and variations will be apparent to those skilled in the art in light of the foregoing description. Accordingly, it is intended to embrace all such alternatives, modifications, and variations that fall within the scope of the included claims. All matters set forth herein or shown in the accompanying drawings are to be interpreted in an illustrative and non-limiting sense.

As described above, according to the exemplary embodiments, provided are the image enhancement algorithm processing method and apparatus which remove a resource and a time which are necessary for a processor to re-set a parameter defining various functions of a hardware accelerator used for the image enhancement algorithm, and prevents a memory stall from occurring when the processor and the hardware accelerator access the same memory address.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

The invention claimed is:

1. An image enhancement algorithm processing apparatus comprising:
   a hardware accelerator;
   a processor configured to:
      set a plurality of different control registers,
      index and store the plurality of different control registers in a buffer,
      call a first control register corresponding to a first index among the plurality of different control registers stored in the buffer by using the first index, and
      command the hardware accelerator to perform a first function defined by the called first control register; and
   a memory configured to be shared by the processor and the hardware accelerator,
   wherein data is read from the memory and is stored in the buffer,
   wherein a first priority is assigned to the processor and a second priority is assigned to the hardware accelerator,
   wherein the processor is further configured to assign the second priority of the hardware accelerator to be higher than the first priority assigned to the processor,
   wherein, when the processor and the hardware accelerator access the buffer, the processor and the hardware accelerator access the buffer in an order according to the assigned priorities,
   wherein the hardware accelerator comprises a plurality of hardware accelerators, and
   wherein each of the plurality of hardware accelerators comprises a priority that is higher than the first priority assigned to the processor.

2. The image enhancement algorithm processing apparatus of claim 1, wherein the plurality of different control registers define different functions.

3. The image enhancement algorithm processing apparatus of claim 1, wherein after commanding the hardware accelerator to perform the first function, the processor is further configured to call a second control register corresponding to a second index among the plurality of different control registers stored in the buffer by using the second index, and command the hardware accelerator to perform a second function defined by the called second control register, the first function being different from the second function.

4. The image enhancement algorithm processing apparatus of claim 3, wherein in the calling of the second control register, a computer program automatically converts an index, and the processor calls a control register corresponding to the index obtained through the conversion among the plurality of different control registers stored in the buffer by using the index.

5. The image enhancement algorithm processing apparatus of claim 3, wherein the hardware accelerator is configured to:
receive a command defined by the second control register, and
perform the second function.

6. The image enhancement algorithm processing apparatus of claim 1, wherein the hardware accelerator is configured to:
receive a command defined by the first control register, and
perform the first function.

7. An image enhancement algorithm processing apparatus comprising:
a hardware accelerator;
a processor configured to:
set a control register defining a second function while the hardware accelerator is performing a first function,
index and store the set control register in a buffer, and
after the hardware accelerator performs the first function, command the hardware accelerator to perform the second function defined by the set control register; and
a memory configured to be shared by the processor and the hardware accelerator,
wherein data is read from the memory and is stored in the buffer,
wherein a first priority is assigned to the processor and a second priority is assigned to the hardware accelerator,
wherein the processor is further configured to assign the second priority of the hardware accelerator to be higher than the first priority assigned to the processor,
wherein, when the processor and the hardware accelerator access the buffer, the processor and the hardware accelerator access the buffer in an order according to the assigned priorities,
wherein the hardware accelerator comprises a plurality of hardware accelerators, and
wherein each of the plurality of hardware accelerators comprises a priority that is higher than the first priority assigned to the processor.

8. An image enhancement algorithm processing method performed by a processor, the image enhancement algorithm processing method comprising:
setting a plurality of different control registers;
indexing and storing the plurality of different control registers in a buffer;
calling a first control register corresponding to a first index among the plurality of different control registers stored in the buffer by using the first index;
commanding a hardware accelerator to perform a first function defined by the called first control register;
storing data read from a memory shared by the processor and the hardware accelerator, in the buffer;
assigning a first priority to the processor and a second priority to the hardware accelerator; and
accessing the buffer in an order according to the assigned priorities, in response to the processor and the hardware accelerator accessing the buffer,
wherein the assigning of the first and second priorities comprises assigning the second priority of the hardware accelerator to be higher than the first priority assigned to the processor,
wherein the hardware accelerator comprises a plurality of hardware accelerators, and
wherein each of the plurality of hardware accelerators comprises a priority that is higher than the first priority assigned to the processor.

9. The image enhancement algorithm processing method of claim 8, further comprising:
calling a second control register corresponding to a second index among the plurality of different control registers stored in the buffer by using the second index; and
commanding the hardware accelerator to perform a second function defined by the called second control register,
wherein the first function differs from the second function.

10. The image enhancement algorithm processing method of claim 9, wherein the calling of the second control register comprises:
automatically converting, by a computer program, an index; and
calling, by the processor, a control register corresponding to the index obtained through the conversion among the plurality of different control registers stored in the buffer by using the index.

11. A non-transitory computer-readable storage medium storing a program for executing the image enhancement algorithm processing method of claim 8 in a computer.

* * * * *